US012476776B2

(12) United States Patent
Lee et al.

(10) Patent No.: US 12,476,776 B2
(45) Date of Patent: Nov. 18, 2025

(54) ELECTRONIC DEVICE USING BLUETOOTH COMMUNICATION, AND OPERATING METHOD THEREOF

(71) Applicant: Samsung Electronics Co., Ltd., Suwon-si (KR)

(72) Inventors: Yunguk Lee, Suwon-si (KR); Inseong Lee, Suwon-si (KR); Jaewon Choi, Suwon-si (KR); Yongwook Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 18/396,179

(22) Filed: Dec. 26, 2023

(65) Prior Publication Data

US 2024/0129102 A1    Apr. 18, 2024

Related U.S. Application Data

(63) Continuation of application No. PCT/KR2022/007746, filed on May 31, 2022.

(30) Foreign Application Priority Data

Jul. 1, 2021 (KR) .................. 10-2021-0086487

(51) Int. Cl.
*H04L 7/00* (2006.01)
*H04B 1/04* (2006.01)
(Continued)

(52) U.S. Cl.
CPC ............. *H04L 7/0008* (2013.01); *H04B 1/04* (2013.01); *H04B 1/16* (2013.01); *H04B 17/318* (2015.01)

(58) Field of Classification Search
CPC ..... G06F 1/16; G06F 1/26; G06F 1/30; G06F 1/32; G06F 3/16; G06F 17/00;
(Continued)

(56) References Cited

U.S. PATENT DOCUMENTS 10,117,191 B2 * 10/2018 Egan .................... H04B 17/318
10,416,955 B2 *  9/2019 Khazin .................. G06F 1/324
(Continued)

FOREIGN PATENT DOCUMENTS

EP         0 794 481 A2    9/1997
JP         2003-108260 A   4/2003
(Continued)

OTHER PUBLICATIONS

International Search Report dated Sep. 6, 2022, issued in International Application No. PCT/KR2022/007746.
(Continued)

*Primary Examiner* — Shawkat M Ali
(74) *Attorney, Agent, or Firm* — Jefferson IP Law, LLP

(57) ABSTRACT

An electronic device is provided. The electronic device includes a speaker, a communication module for supporting Bluetooth communication, one or more processors and, memory storing one or more programs including computer-executable instructions that, when executed by the one or more processors, cause the electronic device to identify the received signal strength indication (RSSI) of a Bluetooth communication signal received from an external electronic device via the communication module, during executing a first function using the speaker, identify whether a second function using the speaker is executed together with the first function, control a frequency value of a driving clock of the one or more processor based on the RSSI and the first function and the second function being executed together, adjust the driving clock of the one or more processor to the
(Continued)

first frequency value when the RSSI is included in a first range indicating a weak electric field, and adjust the driving clock to a second frequency value that is lower than the first frequency value when the RSSI is included in a second range indicating a strong electric field.

20 Claims, 14 Drawing Sheets

(51) Int. Cl.
  *H04B 1/16* (2006.01)
  *H04B 17/318* (2015.01)
(58) Field of Classification Search
  CPC .. G06F 17/30; H04B 1/04; H04B 1/16; H04B 17/00; H04B 17/318; H04B 17/373; H04M 1/00; H04M 1/725; H04R 1/10; H04R 1/1091; H04R 3/00; H04R 19/04; H04W 4/00; H04W 4/80; H04W 8/00; H04W 24/10; H04W 36/00; H04W 52/24; H04W 72/04; H04W 72/08
  USPC ............... 375/219, 260, 262, 267, 295, 316; 455/41.1, 67.11, 418, 456.6, 575.2
  See application file for complete search history.

(56) References Cited

U.S. PATENT DOCUMENTS

| | | | |
|---|---|---|---|
| 11,206,097 B1* | 12/2021 | Jorgovanovic | ........ H04L 1/0021 |
| 2003/0226049 A1 | 12/2003 | Mantani | |
| 2006/0047987 A1 | 3/2006 | Prabhakaran et al. | |
| 2007/0149261 A1 | 6/2007 | Huddart | |
| 2008/0057894 A1 | 3/2008 | Aleksic et al. | |
| 2016/0042743 A1 | 2/2016 | Nyshadham et al. | |
| 2016/0357504 A1 | 12/2016 | Khazin et al. | |
| 2017/0155378 A1* | 6/2017 | Hu | .......................... G06F 1/324 |
| 2021/0120118 A1* | 4/2021 | Gong | ................ H04M 1/72412 |
| 2021/0297518 A1 | 9/2021 | Keum et al. | |

FOREIGN PATENT DOCUMENTS

| | | |
|---|---|---|
| JP | 2005-258662 A | 9/2005 |
| JP | 2005-285093 A | 10/2005 |
| JP | 2007-158633 A | 6/2007 |
| JP | 2020-161986 A | 10/2020 |
| KR | 10-2007-0046198 A | 5/2007 |
| KR | 10-2011-0028803 A | 3/2011 |
| KR | 10-2018-0015638 A | 2/2018 |
| KR | 10-2020-0017702 A | 2/2020 |
| WO | 02/21245 A1 | 3/2002 |

OTHER PUBLICATIONS

Examination report dated Sep. 10, 2025, issued in Korean Application No. 10-2021-0086487.

* cited by examiner (a)

(b)

| Driving mode | Clock | Current consumption | Use time (hrs) |
|---|---|---|---|
| Lower power mode | 24 MHz | 6.37 mA | 8.01 |
| Default | 48 MHz | 8.39 mA | 6.08 |
| Booster mode | 104 MHz | 10.03 mA | 5.09 |
| Power booster mode | 147 MHz | 11.33 mA | 4.50 |

ELECTRONIC DEVICE USING BLUETOOTH COMMUNICATION, AND OPERATING METHOD THEREOF

CROSS-REFERENCE TO RELATED APPLICATION(S)

This application is a continuation application, claiming priority under § 365(c), of an International application No. PCT/KR2022/007746, filed on May 31, 2022, which is based on and claims the benefit of a Korean patent application number 10-2021-0086487, filed on Jul. 1, 2021, in the Korean Intellectual Property Office, the disclosure of which is incorporated by reference herein in its entirety.

BACKGROUND

1. Field

The disclosure relates to an electronic device using Bluetooth communication and a method of operating the same.

2. Description of Related Art

Along with the development of wireless communication technology, an electronic device may communicate with another electronic device through various wireless communication technologies. Bluetooth communication technology refers to a short-range wireless communication technology that allows electronic devices to connect to each other and exchange data or information. Further, the Bluetooth communication technology may include Bluetooth legacy (or classic) network technology or Bluetooth low energy (BLE) networks, and have different types of connectivity topologies, such as piconet and scatternet. Electronic devices may share data with each other at low power using the Bluetooth communication technology. This Bluetooth technology may be used to connect external wireless communication devices, transmit audio data of content running on an electronic device to an external wireless communication device, and process the audio data and output it to a user in the external wireless communication device. Recently, wireless earphones using the Bluetooth communication technology have been widely used.

The above information is presented as background information only to assist with an understanding of the disclosure. No determination has been made, and no assertion is made, as to whether any of the above might be applicable as prior art with regard to the disclosure.

SUMMARY

Conventional wireless earphones using the Bluetooth communication technology only support a wireless call function or a music output function. In recent years, wireless earphones may support a variety of functions (e.g., noise cancellation, artificial intelligence (AI) services, and ambient sound detection) beyond just music output, which may increase power consumption. To ensure the performance of added functions, it may be necessary to support a higher driving clock and thus increase a processing speed. However, the resulting increase in power consumption may decrease a use time. Although a high-capacity battery is required for a longer use time, it may be difficult to mount the high-capacity battery in wireless earphones at the expense of wearing comfort and ease of use.

Aspects of the disclosure are to address at least the above-mentioned problems and/or disadvantages and to provide at least the advantages described below. Accordingly, an aspect of the disclosure is to provide an electronic device for adjusting a driving clock of a processor to reduce power consumption while ensuring an operation and performance suitable for each scenario of a user situation, and a method of operating the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a speaker, a communication module for supporting Bluetooth communication, one or more processors, and memory storing one or more programs including computer-executable instructions that, when executed by the one or more processors, cause the electronic device to identify a received signal strength indication (RSSI) of a Bluetooth communication signal received from an external electronic device via the communication module, during executing a first function using the speaker, identify whether a second function using the speaker is executed together with the first function, control a frequency value of a driving clock of the one or more processors, based on the RSSI and the first function and the second function being executed together, when the RSSI is included in a first range representing a weak electric field, adjust the driving clock of the one or more processors to a first frequency value, and when the RSSI is included in a second range representing a strong electric field, adjust the driving clock to a second frequency value less than the first frequency value.

In accordance with another aspect of the disclosure, a method performed by an electronic device is provided. The method includes identifying an RSSI of a Bluetooth communication signal received from an external electronic device via a communication module of the electronic device, during executing a first function using a speaker of the electronic device, identifying whether a second function using the speaker is executed together with the first function, and controlling a frequency value of a driving clock of one or more processors included in the electronic device, based on the RSSI and the first function and the second function being executed together, wherein the controlling the frequency value of the driving clock includes, when the RSSI is included in a first range representing a weak electric field, adjusting the driving clock of the one or more processors to a first frequency value, and when the RSSI is included in a second range representing a strong electric field, adjusting the driving clock to a second frequency value less than the first frequency value.

In accordance with another aspect of the disclosure, one or more non-transitory computer-readable storage media storing one or more programs including computer-executable instructions that, when executed by one or more processors of an electronic device, cause the electronic device to perform operations include identifying an RSSI of a Bluetooth communication signal received from an external electronic device via a communication module of an electronic device, during executing a first function using a speaker included in the electronic device, identifying whether a second function a speaker of the electronic device is executed together with a first function using the speaker, and controlling a frequency value of a driving clock of one or more processors included in the electronic device, based on the RSSI and the first function and the second function being executed together, wherein the controlling of the frequency value of the driving clock includes, when the RSSI is included in a first range representing a weak electric field, adjusting the driving clock of the one or more processors to a first frequency value, and when the RSSI is included in a second range representing a strong electric field, adjusting the driving clock to a second frequency value less than the first frequency value.

An electronic device according to various embodiments may reduce power consumption while ensuring an operation and performance by adjusting a driving clock of a processor according to each scenario of a user situation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating an operation of reducing power consumption by controlling a driving clock in a first electronic device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more programs which include instructions. The entirety of the one or more programs may be stored in a single memory or the one or more programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
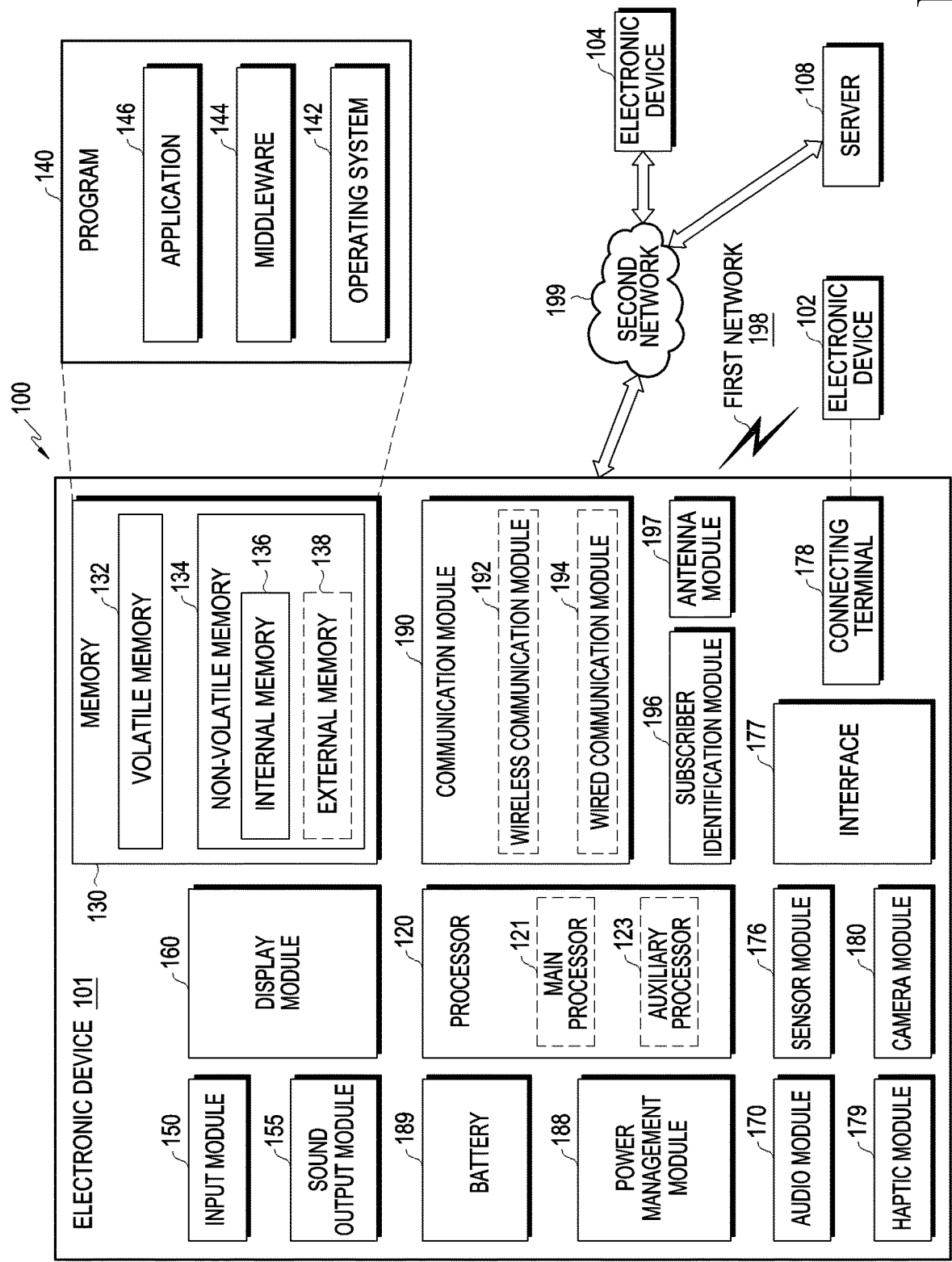
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
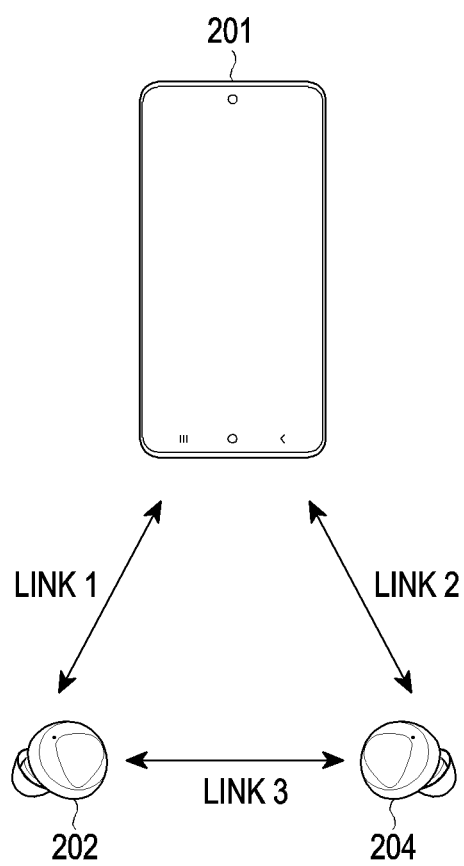
FIG. 2 is a block diagram illustrating an electronic system according to an embodiment of the disclosure.

FIG. 2 is a block diagram illustrating an electronic system according to an embodiment of the disclosure.

Referring to FIG. 2, the electronic system may include an electronic device 201 and a plurality of electronic devices (e.g., a first electronic device 202 and a second electronic device 204). For example, the electronic device 201, the first electronic device 202, and the second electronic device 204 may be implemented identical or similar to the electronic device 101 of FIG. 1. For example, the electronic device 201 may be implemented as a smartphone. The first electronic device 202 and the second electronic device 204 may be implemented as a first-direction earphone (e.g., an earphone worn on the right ear) and a second-direction earphone (e.g., an earphone worn on the left ear). According to an embodiment, the first electronic device 202 and the second electronic device 204 may form, but not limited to, a pair.

According to various embodiments, the electronic device 201 may transmit and receive data to and from the plurality of electronic devices 202 and 204. For this purpose, the electronic device 201 may establish a communication link with the plurality of electronic devices 202 and 204 using a short-range communication scheme (e.g., a Bluetooth communication scheme, a BLE communication scheme, or an AoBLE communication scheme). Referring to FIG. 2, a method of establishing a communication link for data transmission and reception between the electronic device 201 and the plurality of external electronic devices 202 and 204 will be described below. However, this is only exemplary, not limiting the technical idea of the disclosure. For example, the electronic device 201 may establish a communication link with the plurality of electronic devices 202 and 204 in various manners.

Referring to FIG. 2, according to various embodiments, the electronic device 201 may establish a first communication link LINK1 with the first electronic device 202 and a second communication link LINK2 with the second electronic device 204. The electronic device 201 may transmit and receive data to and from the first electronic device 202 using the first communication link LINK1 and transmit and receive data to and from the second electronic device 204 using the second communication link LINK2. For example, the electronic device 201 may transmit audio data to the first electronic device 202 and the second electronic device 204 via at least one of the first communication link LINK1 and the second communication link LINK2.

According to various embodiments, the first electronic device 202 may establish a third communication link LINK3 with the second electronic device 204. The first electronic device 202 may transmit and receive data to and from the second electronic device 204 using the third communication link LINK3.

According to various embodiments, the first communication link LINK1, the second communication link LINK2, and the third communication link LINK3 may be established as Bluetooth low energy (BLE) communication links. However, the technical idea of the disclosure is not limited thereto, and the first communication link LINK1, the second communication link LINK2, and the third communication link LINK3 may be established as communication links based on various schemes.

According to various embodiments, the electronic device 201 may establish only the communication link LINK1 with the first electronic device 202, without establishing the second communication link LINK2. The electronic device 201 may transmit and receive data (e.g., audio data) to and from the first electronic device 202 via the first communication link LINK1. The second electronic device 204 may obtain or receive the data (e.g., audio data) transmitted from the electronic device 201 by sniffing. Alternatively, the second electronic device 204 may obtain or receive the data from the first electronic device 202.

According to various embodiments, the first electronic device 202 may be set as a master in Bluetooth communication, and the second electronic device 204 may be set as a slave in Bluetooth communication. For example, the first electronic device 202 may transmit and receive data to and from the electronic device 201 through Bluetooth communication. Further, the first electronic device 202 may identify a received signal strength indication (RSSI) and identify a connection state with the electronic device 201 based on the RSSI. On the other hand, the second electronic device 204 may be set as a master, and the first electronic device 202 may be set as a slave. For ease of explanation, however, this specification will be described on the assumption that the first electronic device 202 is set as a master.

Figure 3A:
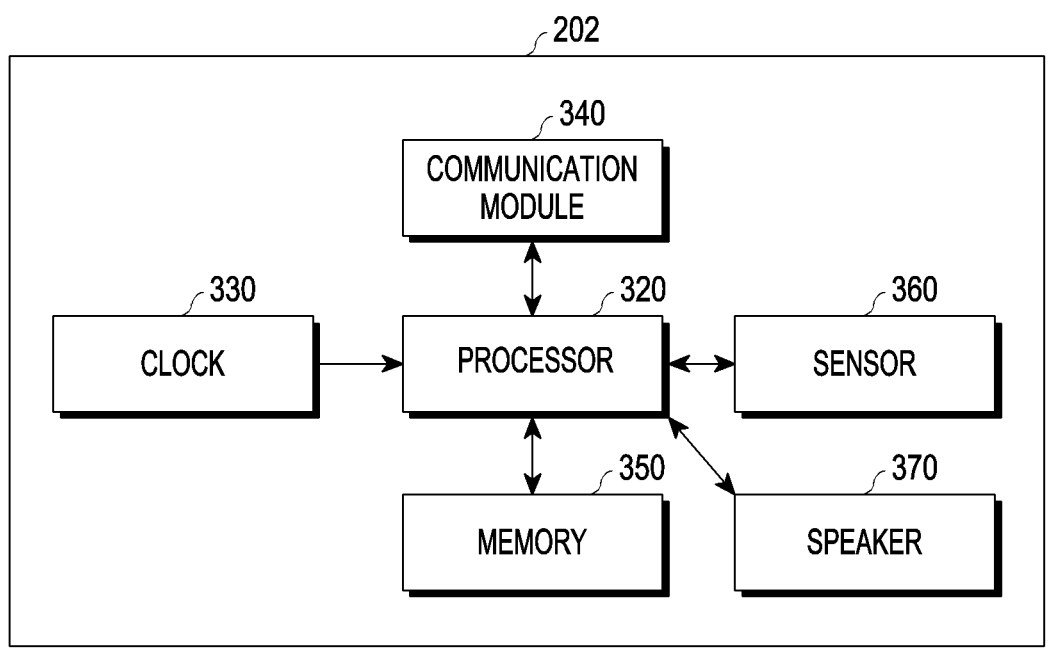
FIG. 3A is a block diagram illustrating a first electronic device according to an embodiment of the disclosure.

FIG. 3A is a block diagram illustrating a first electronic device according to an embodiment of the disclosure.

Referring to FIG. 3A, the first electronic device 202 may include a processor 320, a clock 330, a communication module 340, memory 350, a sensor 360, and a speaker 370.

According to various embodiments, the processor 320 may provide overall control to the operations of the first electronic device 202. The processor 320 may be implemented identical or similar to the processor 120 of FIG. 1.

According to various embodiments, the processor 320 may receive a communication signal based on Bluetooth communication technology (hereinafter, referred to as a Bluetooth communication signal) via the communication module 340 (e.g., the communication module 190 of FIG. 1). For example, the communication module 340 may support the Bluetooth communication technology. The processor 320 may identify the RSSI of the received Bluetooth communication signal. The processor 320 may measure the RSSI of the Bluetooth communication signal a specified number of times for a specified time period, and determine the average of measured RSSIs as the RSSI. For example, when the RSSI is less than a specified first threshold, the processor 320 may determine the communication state to be a weak electric field. When the RSSI is greater than a specified second threshold, the processor 320 may determine the communication state to be a strong electric field. When the RSSI is between the first threshold and the second threshold, the processor 320 may determine the communication state to be a medium or normal electric field.

According to various embodiments, the processor 320 may execute a plurality of functions using the speaker 370. For example, the plurality of functions may refer to functions supported by the electronic device 201. For example, the plurality of functions may include an audio playback function, an advanced audio distribution profile (A2DP) function, a noise cancellation function, an artificial intelligence (AI) service function, an AI voice assistant function, and an ambient sound detection function. The processor 320 may execute the plurality of functions simultaneously.

According to various embodiments, the processor 320 may identify the number of currently executed functions among the functions supported by the electronic device 201. For example, the processor 320 may identify the number of currently executed functions through a monitoring module (or a monitoring handler). The processor 320 may control or adjust the frequency value of a driving clock of the processor 320 based on the number of currently executed functions.

According to various embodiments, the processor 320 may execute a first function (e.g., the A2DP function) using the speaker 370. The processor 320 may identify whether a second function using the speaker 370 is executed together with the first function. That is, the processor 320 may identify whether the second function is currently executed simultaneously with the first function.

According to various embodiments, the processor 320 may control or adjust the frequency value of the driving clock of the processor 320 based on the first function and the second function which are executed together. For example, when the first function and the second function are executed together, the processor 320 may increase or decrease the frequency value of the driving clock based on the identified RSSI. Alternatively, when the first function and the second function are executed together, the processor 320 may maintain the frequency value of the driving clock based on the identified RSSI. Therefore, the processor 320 may reduce the power consumption of the electronic device 202, while maintaining performance.

According to various embodiments, the processor 320 may control or adjust the frequency value of the driving clock of the processor 320 based on the types of the first function and the second function which are currently executed simultaneously. For example, the processor 320 may increase the frequency value of the driving clock, when the first and second functions require high throughput. Alternatively, the processor 320 may increase the frequency value of the driving clock by a relatively small amount, when the first function and the second function require low throughput.

According to various embodiments, the processor 320 may identify whether the operation state of the electronic device 201 is a sleep state or a charging state (e.g., a charging in progress state). When the electronic device 201 is in the sleep state or the charging state, the processor 320 may decrease the driving clock of the processor 320 or maintain it at a lower frequency value.

According to various embodiments, the clock 330 may output a clock signal of a specified frequency value (e.g., 24 megahertz (MHz)) to the processor 320. Although FIG. 3A depicts the clock 330 as hardware separate from the processor 320, the clock 330 may be included in the processor 320. The processor 320 may generate a driving clock for driving the processor 320 based on the clock signal output from the clock 330. Further, the processor 320 may operate based on the driving clock.

According to various embodiments, the memory 350 may store data of the first electronic device 202. For example, the memory 350 may be implemented identical or similar to the memory 130 of FIG. 1. The memory 350 may store data associated with a program or application for executing the plurality of functions supported by the electronic device 201.

According to various embodiments, the processor 320 may detect a touch input (e.g., an input to execute a specified function) or identify whether a user wears the first electronic device 202, using the sensor 360. For example, the sensor 360 may be implemented identical or similar to the sensor module 176 of FIG. 1.

According to various embodiments, the processor 320 may output audio via the speaker 370. For example, the speaker 370 may be implemented identical or similar to the sound output module 155 of FIG. 1. For example, the plurality of functions supported by the electronic device 201 may be functions using the speaker 370.

According to various embodiments, the first electronic device 202 may further include a battery (not shown) (e.g., the battery 189 of FIG. 1). For example, the battery may be implemented as a small battery. The processor 320 may identify the power state (e.g., charging state) of the battery (not shown). For example, the processor 320 may compare a voltage of the battery with a specified voltage (e.g., 3.4V) and control an operation based on the comparison. For example, the specified voltage may be a threshold voltage for identifying the charging state. The processor 320 may change a period of reading data from the sensor 360 based on the power state of the battery and the RSSI value of a Bluetooth communication signal.

According to various embodiments, the processor 320 may control or adjust the frequency value of the driving clock of the processor 320 based on the power state of the battery in the electronic device 201. For example, the processor 320 may control or adjust the frequency value of the driving clock of the processor 320 based on whether the first function and the second function are executed together and the power state of the battery.

Figure 3B:
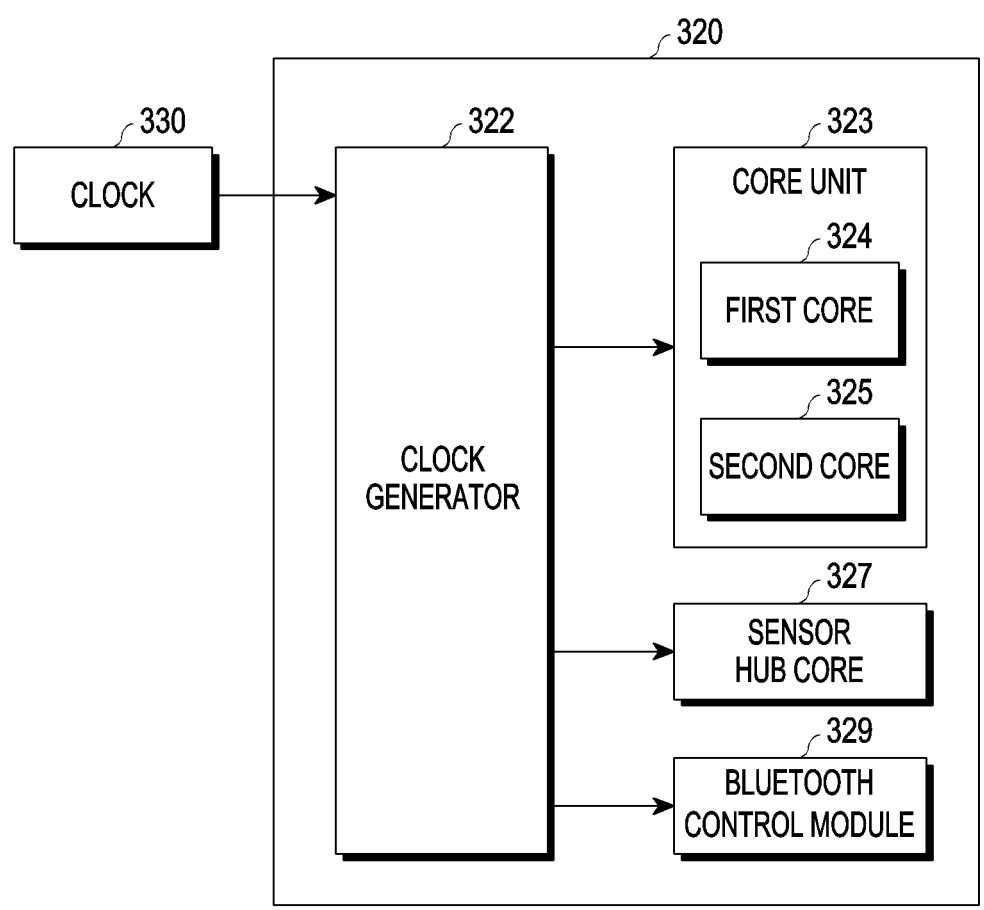
FIG. 3B is a block diagram illustrating a processor according to an embodiment of the disclosure.

FIG. 3B is a block diagram illustrating a processor according to an embodiment of the disclosure.

Referring to FIG. 3B, the processor 320 may include a clock generator 322, a core unit 323, a sensor hub core 327, and a Bluetooth control module 329.

According to various embodiments, the clock generator 322 may generate at least one driving clock to drive the processor 320 based on a clock signal output from the clock 330. For example, the clock generator 322 may generate the clock according to any one of a phase locked loop (PLL) scheme and a delayed locked loop (DLL) scheme.

According to various embodiments, the clock generator 322 may generate a first driving clock based on the clock signal output from the clock 330 and output the first driving clock to the core unit 323. The first driving clock may be applied to each of a first core 324 and a second core 325. For example, the first driving clock may have a frequency value of 26 MHz to 208 MHz. The clock generator 322 may generate a second driving clock based on the clock signal output from the clock 330 and output the second driving clock to the sensor hub core 327. For example, the second driving clock may have a frequency value of 24 MHz. The clock generator 322 may generate a third driving clock based on the clock signal output from the clock 330 and output the third driving clock to the Bluetooth control module 329. For example, the third driving clock may have a frequency value of 48 MHz.

According to various embodiments, the clock generator 322 may control or adjust the frequency value of the first driving clock. For example, the clock generator 322 may control or adjust the frequency value of the first driving clock based on the RSSI of a Bluetooth communication signal obtained via the Bluetooth control module 329 and functions being executed in the core unit 323 (e.g., the number and/or types of the functions being executed).

According to various embodiments, the core unit 323 may include the first core 324 and the second core 325. For example, the first core 324 may be implemented as an application processor, and the second core 325 may be implemented as an auxiliary processor. Each of the first core 324 and the second core 325 may operate based on the first driving clock.

While FIG. 3B illustrates that the core unit 323 includes two cores, the number of cores included in the core unit 323 may not be limited. For example, the core unit 323 may include a single core or a plurality of cores (or multiple cores).

According to various embodiments, the sensor hub core 327 may control the sensor 360. For example, the sensor hub core 327 may read or obtain data from the sensor 360. For example, the sensor hub core 327 may change a data reading period based on the power state (or charging state) of the battery included in the electronic device 202. The sensor hub core 327 may operate based on the second driving clock.

According to various embodiments, the Bluetooth control module 329 may control Bluetooth communication. For example, the Bluetooth control module 329 may obtain and identify the RSSI of a Bluetooth communication signal. The Bluetooth control module 329 may operate based on the third driving clock.

For ease of description, only the first electronic device 202 is described herein. However, the technical features of the first electronic device 202 are also equally applicable to the second electronic device 204.

The operation of the first electronic device 202 described below may be controlled by the processor 320. While for ease of description, the first electronic device 202 is described as performing the following operations, the technical features of the disclosure may be implemented by the second electronic device 204.

Figure 4:
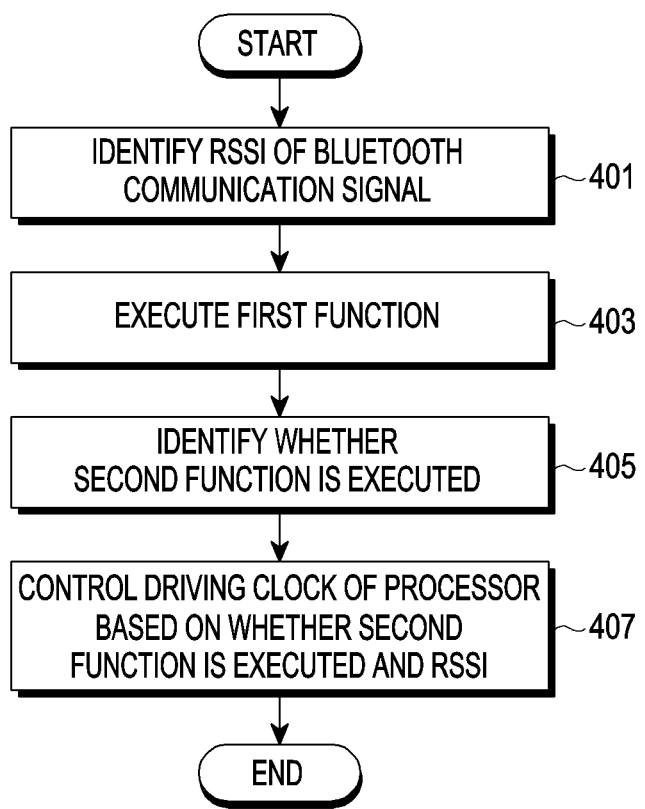
FIG. 4 is a flowchart illustrating a method of controlling a driving clock in a first electronic device according to an embodiment of the disclosure.

FIG. 4 is a flowchart illustrating a method of controlling a driving clock in a first electronic device according to an embodiment of the disclosure.

Referring to FIG. 4, in operation 401, the first electronic device 202 may identify the RSSI of a Bluetooth communication signal according to various embodiments. The first electronic device 202 may identify the RSSI of the Bluetooth communication signal a specified number of times for a specified time period and determine the average of the identified RSSIs as the RSSI. For example, the first electronic device 202 may receive a Bluetooth communication signal and identify the RSSI of the Bluetooth communication signal periodically or aperiodically. For example, the first electronic device 202 may identify the communication state (or electric field state) of the first communication link LINK1 connected to the electronic device 201 based on the identified RSSI. Alternatively, the first electronic device 202 may also identify the communication state (or electric field state) of the third communication link LINK3 connected to the second electronic device 204 based on the identified RSSI.

According to various embodiments, in operation 403, the first electronic device 202 may execute a first function of a plurality of functions using the speaker 370.

According to various embodiments, in operation 405, the first electronic device 202 may identify whether a second function of the plurality of functions using the speaker 370 is executed together with (or in parallel to) the first function.

According to various embodiments, in operation 407, the first electronic device 202 may control a driving clock of the processor 320 based on whether the second function is executed together with (or in parallel to) the first function, and the identified RSSI. For example, when the first and second functions are executed together, the first electronic device 202 may determine (or set) the driving clock of the processor 320 to have a higher frequency value than when only the first function is executed. Further, in the case of a weak electric field in which the RSSI is less than a specified value, the first electronic device 202 may determine (or set) the driving clock of the processor 320 to have a higher frequency value than when the RSSI is higher than the specified value. In this way, the first electronic device 202 may reduce power consumption while maintaining performance for executing both the first function and the second function.

According to various embodiments, when the execution of the second function is terminated, the first electronic device 202 may identify the RSSI of a Bluetooth communication signal transmitted between the first electronic device 202 and the electronic device 201 and readjust the driving clock of the processor 320 based on the identified RSSI. For example, when the execution of the second function is terminated, the first electronic device 202 may readjust the driving clock of the processor 320 based on the identified RSSI.

Figure 5:
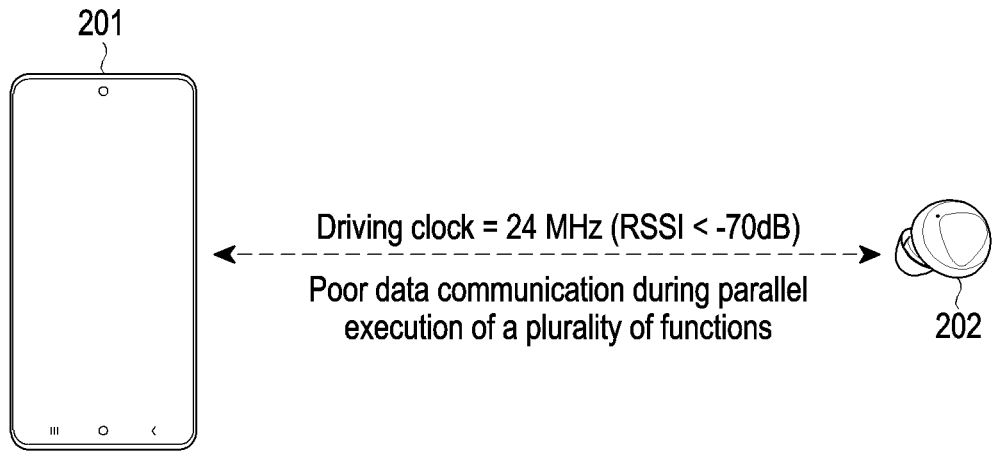
FIG. 5 is a diagram illustrating a method of increasing a processing speed by controlling a driving clock in a first electronic device according to an embodiment of the disclosure.
Figure 5:
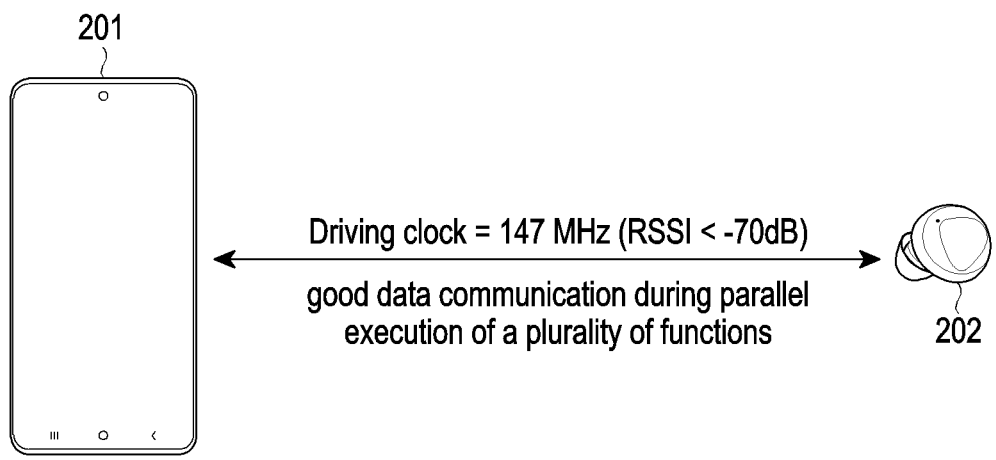

FIG. 5 is a diagram illustrating an operation of increasing a processing speed by controlling a driving clock in a first electronic device according to an embodiment of the disclosure.

Referring to part (a) of FIG. 5, according to various embodiments, in the case where an RSSI is less than a specified value (e.g., −70B), the first electronic device 202 may not perform data communication well when executing a plurality of functions in parallel with a driving clock of the processor 320 set to 24 MHz. For example, the first electronic device 202 may not be able to smoothly receive data from the electronic device 201 while simultaneously executing a plurality of functions in parallel. For example, the first electronic device 202 may not be able to smoothly execute a first function (e.g., the A2DP function) of the plurality of functions. For example, when the plurality of functions are executed simultaneously, more processes may be added than when the first function (e.g., the A2DP function) is executed simply. The low driving clock may slow down the processing speeds of the processes, and thus data loss may result sound stuttering.

According to various embodiments, referring to part (b) of FIG. 5, in the case where an RSSI is less than a specified value (e.g., −70 dB), the first electronic device 202 may perform data communication well, when executing a plurality of functions in parallel with a driving clock of the processor 320 set to 147 MHz. For example, the first electronic device 202 may smoothly receive data from the electronic device 201 while simultaneously executing the plurality of functions in parallel. For example, the first electronic device 202 may smoothly execute a first function (e.g., the A2DP function) of the plurality of functions. For example, the first electronic device 202 may smoothly handle added processes by increasing the frequency value of the driving clock of the processor 320, compared to part (a) of FIG. 5. For example, the first electronic device 202 may operate an additional compensation algorithm or increase the number of recoveries of transmitted and received data packets by increasing a system clock, thereby recovering source data without data loss. Accordingly, the first electronic device 202 may eliminate sound stuttering, while smoothly executing the plurality of functions.

According to various embodiments, when executing the plurality of functions in parallel, the first electronic device 202 may increase the frequency value of the driving clock of the processor 320. In this case, the first electronic device 202 may adjust the frequency value of the driving clock according to each electric field state, taking into account the RSSI of a Bluetooth communication signal.

Figure 6:
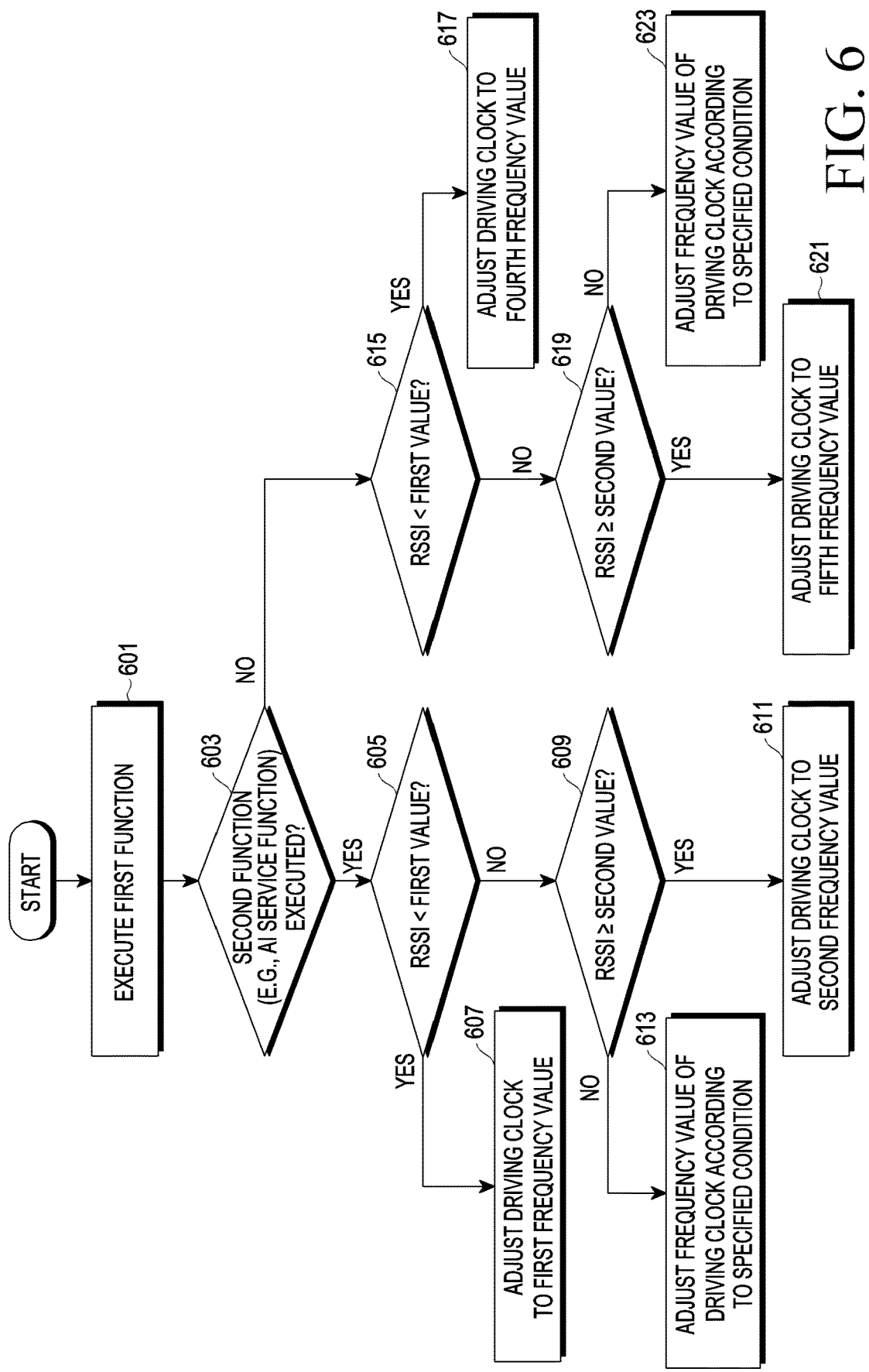
FIG. 6 is a flowchart illustrating a method of controlling a driving clock based on simultaneous execution of a first function and a second function in a first electronic device according to an embodiment of the disclosure.

FIG. 6 is a flowchart illustrating a method of controlling a driving clock based on simultaneous execution of a first function and a second function in a first electronic device according to an embodiment of the disclosure.

Referring to FIG. 6, according to various embodiments, the first electronic device 202 may execute a first function of a plurality of functions using the speaker 370 in operation 601. For example, the first function may be an A2DP function. For example, the first electronic device 202 may output audio data received from the electronic device 201 via the speaker 370. The first electronic device 202 may set a driving clock of the processor 320 to a default frequency value (e.g., 48 MHz).

In operation 603, according to various embodiments, the first electronic device 202 may identify whether a second function (e.g., an AI service function or an AI voice assistant function) is executed together with (or in parallel to) the first function.

According to various embodiments, when the second function is executed together with the first function (yes in operation 603), the first electronic device 202 may identify whether an RSSI is included in a first range representing a weak electric field. For example, in operation 605, the first electronic device 202 may compare the RSSI of a Bluetooth communication signal with a specified first value (e.g., −70 dB). For example, the first electronic device 202 may identify whether the RSSI of the Bluetooth communication signal is less than the specified first value. For example, the specified first value may be a threshold for identifying whether a Bluetooth communication state is a weak electric field. For example, the specified first value may be −70 dB, which may be changed by the user or the processor 320.

According to various embodiments, when the RSSI is less than the specified first value (yes in operation 605), that is, when the RSSI is included in the first range representing a weak electric field, the first electronic device 202 may adjust the driving clock of the processor 320 to a first frequency value in operation 607. The first frequency value may be greater than the default frequency value. For example, the first frequency value may be 147 MHz, which may be changed by the user or the processor 320.

According to various embodiments, when the RSSI is not less than the specified first value (no in operation 605), the first electronic device 202 may identify whether the RSSI is included in a second range representing a strong electric field or a third range representing a medium electric field. For example, the first electronic device 202 may compare the RSSI of the Bluetooth communication signal with a specified second value (e.g., −45 dB) in operation 609. For example, the first electronic device 202 may identify whether the RSSI of the Bluetooth communication signal is greater than or equal to the specified second value. For example, the specified second value may be a threshold for identifying whether the Bluetooth communication state is a strong electric field. For example, the specified second value may be −45 dB, which may be changed by the user or the processor 320.

According to various embodiments, when the RSSI is greater than or equal to the specified second value (yes in operation 609), that is, when the RSSI is included in the second range representing a strong electric field, the first electronic device 202 may adjust the driving clock of the processor 320 to a second frequency value in operation 611. The second frequency value may be greater than the default frequency value and less than the first frequency value. For example, the second frequency value may be 104 MHz, which may be changed by the user or the processor 320.

According to various embodiments, when the RSSI is less than the specified second value (no in operation 609), that is, when the RSSI is included in the third range representing a medium electric field, the first electronic device 202 may adjust the frequency value of the driving clock of the processor 320 according to a specified condition in operation 613. According to an embodiment, the first electronic device 202 may adjust the driving clock of the processor 320 to a third frequency value. The third frequency value may be a frequency value between the first frequency value and the second frequency value. For example, the third frequency value may be 122 MHz, which may be changed by the user or the processor 320. According to another embodiment, the first electronic device 202 may adjust the driving clock of the processor 320 to the first frequency value or the second frequency value based on the specified condition. For example, the first electronic device 202 may adjust the driving clock of the processor 320 to the first frequency value (e.g., 147 MHz), when identifying that the current identified RSSI value has been changed from the first range to the second range or the third range (e.g., when the user has moved from a weak electric field to a medium electric field or a strong electric field). Alternatively, the first electronic device 202 may adjust the driving clock of the processor 320 to the second frequency value (e.g., 104 MHz), when identifying that the current identified RSSI value has been changed from the second range to the first range or the third range (e.g., when the user has moved from a strong electric field to a medium electric field or a weak electric field).

According to various embodiments, when the execution of the second function is subsequently terminated, the first electronic device 202 may identify the RSSI of a Bluetooth communication signal and readjust the driving clock of the processor 320 based on the identified RSSI. A related operation of the first electronic device 202 may be performed in the same manner as the following method of adjusting the driving clock of the processor 320 in the first electronic device 202 when the second function is not executed together with the first function.

According to various embodiments, when the second function is not executed together with the first function (no in operation 603), the first electronic device 202 may identify whether the RSSI is included in the first range representing a weak electric field. For example, the first electronic device 202 may compare the RSSI of the Bluetooth communication signal with the specified first value (e.g., −70 dB) in operation 615. For example, the first electronic device 202 may identify whether the RSSI of the Bluetooth communication signal is less than the specified first value (e.g., −70 dB).

According to various embodiments, when the RSSI is less than the specified first value (yes in operation 615), that is, when the RSSI is included in the first range representing a weak electric field, the first electronic device 202 may adjust the driving clock of the processor 320 to a fourth frequency value in operation 617. The fourth frequency value may be greater than the default frequency value. For example, the fourth frequency value may be 96 MHz, which may be changed by the user or the processor 320.

According to various embodiments, when the RSSI is not less than the specified first value (no in operation 615), the first electronic device 202 may identify whether the RSSI is included in the second range representing a strong electric field or the third range representing a medium electric field. For example, the first electronic device 202 may compare the RSSI of the Bluetooth communication signal with the specified second value (e.g., −45 dB) in operation 619. For example, the first electronic device 202 may identify whether the RSSI of the Bluetooth communication signal is greater than or equal to the specified second value.

According to various embodiments, when the RSSI is greater than or equal to the specified second value (yes in operation 619), that is, when the RSSI is included in the second range representing a strong electric field, the first electronic device 202 may adjust the driving clock of the processor 320 to a fifth frequency value in operation 621. The fifth frequency value may be less than or equal to the default frequency value. For example, the fifth frequency value may be 24 MHz, which may be changed by the user or the processor 320.

According to various embodiments, when the RSSI is less than the specified second value (no in operation 619), that is, when the RSSI is included in the third range representing a medium field, the first electronic device 202 may adjust the frequency value of the driving clock of the processor 320 based on a specified condition in operation 623. According to an embodiment, the first electronic device 202 may adjust the driving clock of the processor 320 to a sixth frequency value. The sixth frequency value may be a frequency value between the fourth frequency value and the fifth frequency value. For example, the sixth frequency value may be equal to the default frequency value. For example, the sixth frequency value may be 48 MHz, which may be changed by the user or the processor 320. According to another embodiment, the first electronic device 202 may adjust the driving clock of the processor 320 to the fourth frequency value or the fifth frequency value based on the specified condition. For example, the first electronic device 202 may adjust the driving clock of the processor 320 to the fourth frequency value (e.g., 96 MHz), when identifying that the current identified RSSI value has been changed from the first range to the second range or the third range (e.g., when the user has moved from a weak electric field to a medium electric field or a strong electric field). Alternatively, the first electronic device 202 may adjust the driving clock of the processor 320 to the fifth frequency value (e.g., 24 MHz), when identifying that the current identified RSSI value has been changed from the second range to the first range or the third range (e.g., when the user has moved from a strong electric field to a medium electric field or a weak electric field).

FIG. 7 is a diagram illustrating an operation of controlling a driving clock to reduce power consumption in a first electronic device according to an embodiment of the disclosure.

Referring to FIG. 7, according to various embodiments, the first electronic device 202 may adjust the driving clock of the processor 320 based on an operation mode. For example, the first electronic device 202 may set a driving clock of the processor 320 to 48 MHz in a default mode. In a low power mode, the first electronic device 202 may set the driving clock of the processor 320 to 24 MHz. In a booster mode, the first electronic device 202 may set the driving clock of the processor 320 to 104 MHz. In a power booster mode, the first electronic device 202 may set the driving clock of the processor 320 to 147 MHz. In this case, when the driving clock is increased, current consumption may increase and the use time of the first electronic device 202 may decrease. Further, when the driving clock is decreased, the current consumption may decrease and the use time of the first electronic device 202 may increase. For example, when the first electronic device 202 operates in the low power mode, the current consumption may be reduced by about 5 mA and the use time may be increased by about 3.5 hours, compared to when the first electronic device 202 operates in the power booster mode.

According to various embodiments, the first electronic device 202 may adjust the operation mode or the driving clock of the processor 320 based on whether a plurality of functions are executed simultaneously or in parallel and the RSSI of a Bluetooth communication signal. The first electronic device 202 may reduce power consumption and maintain performance by adjusting the driving clock adaptively according to a situation as in the above-described method.

Figure 8:
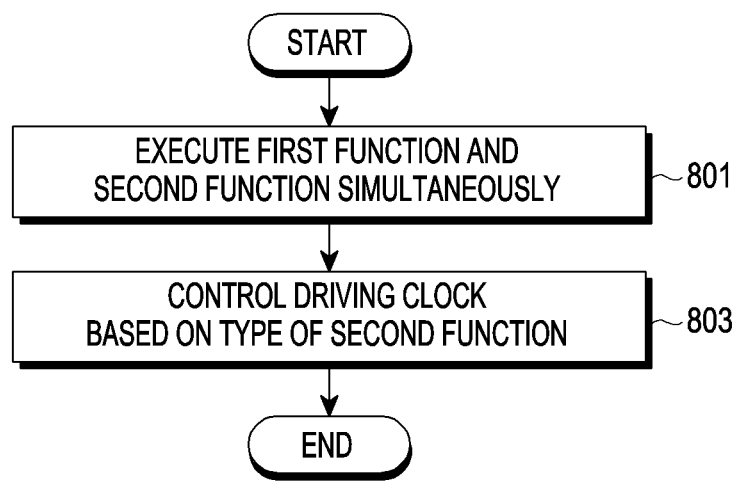
FIG. 8 is a flowchart illustrating a method of controlling a driving clock based on a type of a second function executed simultaneously with a first function in a first electronic device according to an embodiment of the disclosure.

FIG. 8 is a flowchart illustrating a method of controlling a driving clock based on the type of a second function executed simultaneously with a first function in a first electronic device according to an embodiment of the disclosure.

According to various embodiments, the first electronic device 202 may execute a first function and a second function simultaneously (or in parallel) in operation 801.

According to various embodiments, the first electronic device 202 may control a driving clock of the processor 320 based on the type of the second function executed simultaneously with the first function in operation 803. For example, the first electronic device 202 may determine a frequency value of the driving clock based on the type of the second function executed together with the first function. For example, the frequency value of the driving clock in the case of simultaneous execution of an AI service function and an A2DP function may be different from the frequency value of the driving clock in the case of simultaneous execution of a noise cancellation function (or an ambient sound detection function) and the A2DP function. This operation will be described below in more detail with reference to FIG. 9.

According to another embodiment, the first electronic device 202 may control the driving clock of the processor 320 by considering the types of both the first function and the second function executed simultaneously. That is, the first electronic device 202 may determine the driving clock of the processor 320 by considering the type of the first function as well as the type of the second function.

Figure 9:
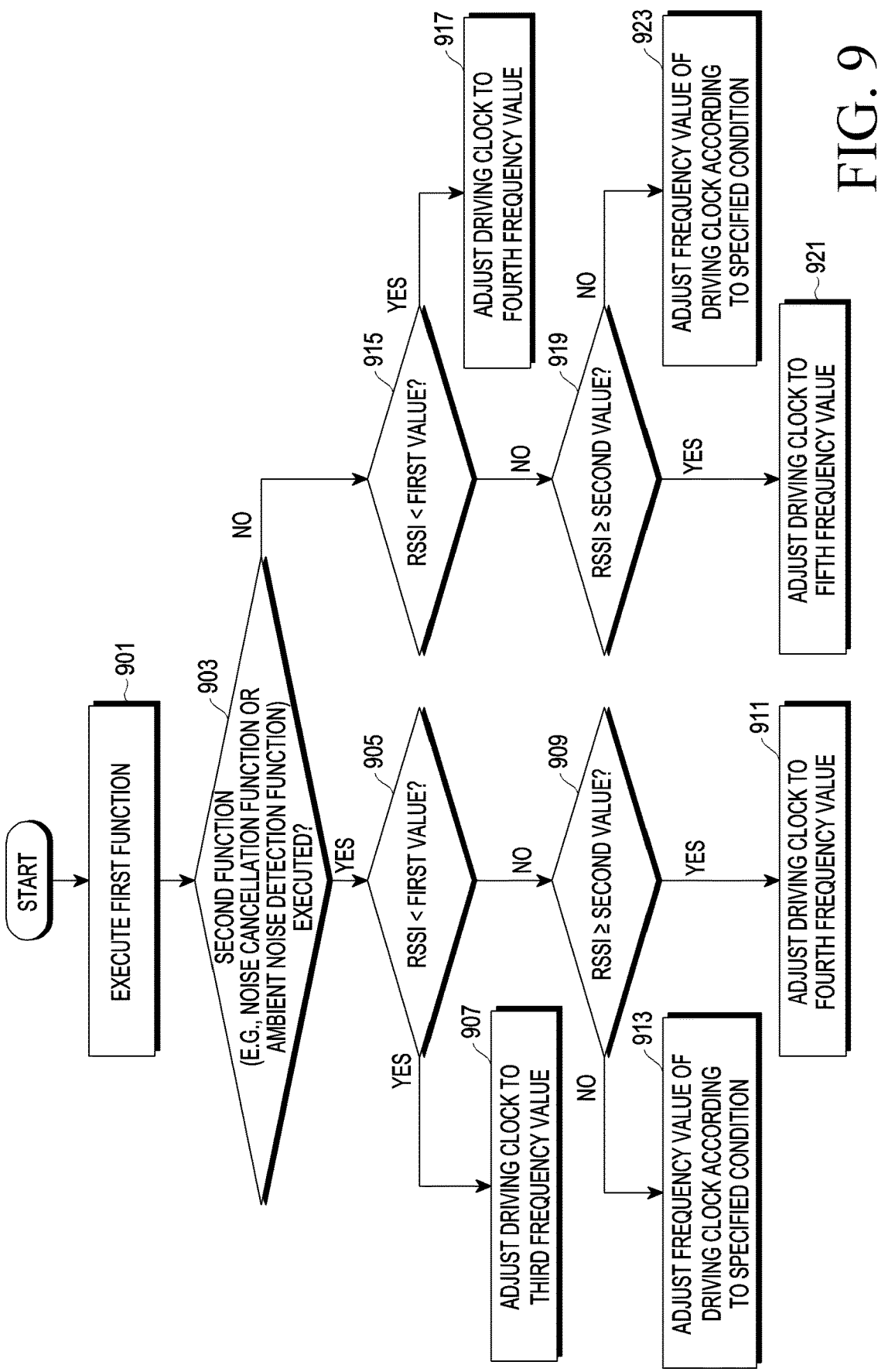
FIG. 9 is a flowchart illustrating a method of controlling a driving clock based on a type of a second function executed simultaneously with a first function in a first electronic device according to an embodiment of the disclosure.

FIG. 9 is a flowchart illustrating a method of controlling a driving clock based on the type of a second function executed simultaneously with a first function in a first electronic device according to an embodiment of the disclosure.

Referring to FIG. 9, according to various embodiments, the first electronic device 202 may execute a first function of a plurality of functions using the speaker 370 in operation 901. For example, the first function may be an A2DP function. For example, the first electronic device 202 may output audio data received from the electronic device 201 via the speaker 370. The first electronic device 202 may set a driving clock of the processor 320 to a default frequency value (e.g., 48 MHz).

According to various embodiments, the first electronic device 202 may identify whether a second function (e.g., a noise cancellation function or an ambient sound detection function) using the speaker (e.g., 370 in FIG. 3A) and/or a microphone (e.g., 150 in FIG. 1) is executed together with (or in parallel to) the first function in operation 903. For example, the second function may be different from the AI service function (or AI voice assistant function) described before with reference to FIG. 6.

According to various embodiments, when the second function is executed together with the first function (yes in operation 903), the first electronic device 202 may identify whether an RSSI is included in a first range representing a weak electric field. For example, in operation 905, the first electronic device 202 may identify whether the RSSI of a Bluetooth communication signal is less than a specified first value (e.g., −70 dB).

According to various embodiments, when the RSSI is less than the specified first value (yes in operation 905), that is, when the RSSI is included in the first range representing a weak electric field, the first electronic device 202 may adjust the driving clock of the processor 320 to a third frequency value in operation 907. For example, the first electronic device 202 may determine the driving clock of the processor 320 to have the third frequency value lower than when the AI service function (or the AI voice assistant function) described before with reference to FIG. 6 is executed. For example, the third frequency value may be 122 MHz, which may be changed by the user or the processor 320.

According to various embodiments, when the RSSI is not less than the specified first value (no in operation 905), the first electronic device 202 may identify whether the RSSI is included in a second range representing a strong electric field or a third range representing a medium electric field. For example, the first electronic device 202 may identify whether the RSSI of the Bluetooth communication signal is greater than or equal to a specified second value (e.g., −45 dB) in operation 909.

According to various embodiments, when the RSSI is greater than or equal to the specified second value (yes in operation 909), that is, when the RSSI is included in the second range representing a strong electric field, the first electronic device 202 may adjust the driving clock of the processor 320 to a second frequency value in operation 911. The second frequency value may be greater than a default frequency value and less than the third frequency value. For example, the second frequency value may be 104 MHz, which may be changed by the user or the processor 320.

According to various embodiments, when the RSSI is less than the specified second value (no in operation 909), that is, when the RSSI is included in the third range representing a medium electric field, the first electronic device 202 may adjust the frequency value of the driving clock of the processor 320 based on a specified condition in operation 913. According to an embodiment, the first electronic device 202 may adjust the driving clock of the processor 320 to a frequency value between the third frequency value and the second frequency value. For example, the third frequency value may be 113 MHz, which may be changed by the user or the processor 320. According to another embodiment, the first electronic device 202 may adjust the driving clock of the processor 320 to the third frequency value or the second frequency value based on the specified condition (e.g., the specified condition may be the same as the condition described before with reference to FIG. 6).

According to various embodiments, when the second function is not executed together with the first function (no in operation 903), operations 915, 917, 919, 921 and 923 may be performed in the same manner as operation 615 to operation 623 of FIG. 6. That is, the first electronic device 202 may adjust the driving clock of the processor 320 based on the RSSI without considering the type of the second function because no second function is executed.

Figure 10:
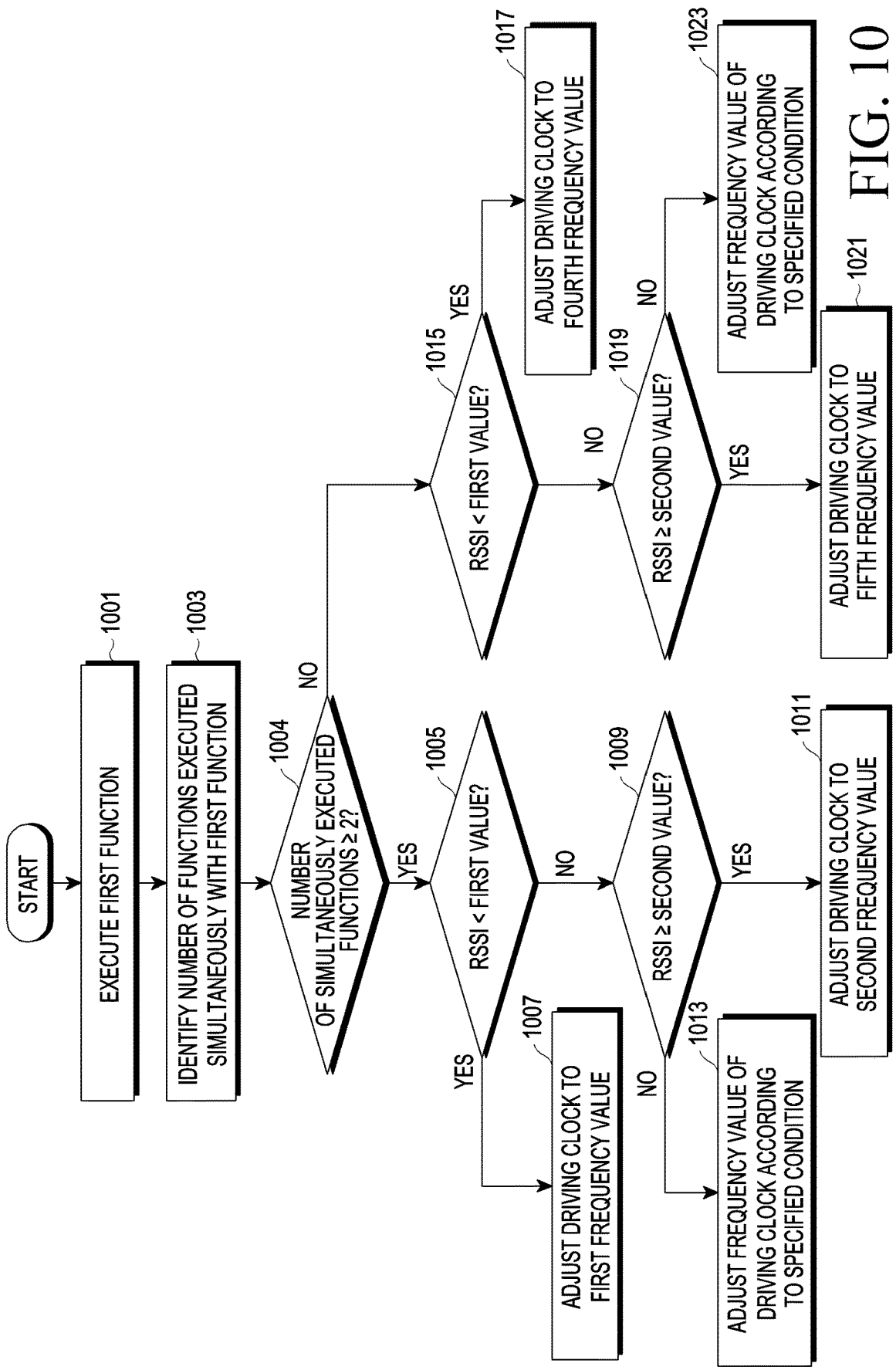
FIG. 10 is a flowchart illustrating a method of controlling a driving clock based on the number of functions executed simultaneously with a first function in a first electronic device according to an embodiment of the disclosure.

FIG. 10 is a flowchart illustrating a method of controlling a driving clock based on the number of functions executed simultaneously with a first function in a first electronic device according to an embodiment of the disclosure.

Referring to FIG. 10, in operation 1001, the first electronic device 202 may execute a first function of a plurality of functions using the speaker 370 according to various embodiments. For example, the first function may be an A2DP function. For example, the first electronic device 202 may output audio data received from the electronic device 201 via the speaker 370. The first electronic device 202 may set a driving clock of the processor 320 to a default frequency value (e.g., 48 MHz).

According to various embodiments, the first electronic device 202 may identify the number of functions (e.g., an AI service function, an AI voice assistant function, a noise cancellation function, and/or an ambient sound detection function) executed simultaneously with (or in parallel to) the first function (e.g., the number of simultaneously executed functions including the first function) in operation 1003. For example, the first electronic device 202 may identify the number of functions executed simultaneously with the first function periodically or aperiodically through the monitoring module.

According to various embodiments, in operation 1004, the first electronic device 202 may identify whether the number of functions executed simultaneously with (or in parallel to) the first function is equal to or greater than 2. That is, the first electronic device 202 may identify whether a plurality of functions are currently executed.

According to various embodiments, when a plurality of functions are currently executed (yes in operation 1004), the first electronic device 202 may identify whether an RSSI is included in a first range representing a weak electric field. For example, in operation 1005, the first electronic device 202 may identify whether the RSSI of a Bluetooth communication signal is less than a specified first value (e.g., −70 dB).

According to various embodiments, when the RSSI is less than the specified first value (yes in operation 1005), that is, when the RSSI is included in the first range representing a weak electric field, the first electronic device 202 may adjust a driving clock of the processor 320 to a first frequency value (e.g., 147 MHz) in operation 1007.

According to various embodiments, when the RSSI is not less than the specified first value (no in operation 1005), the first electronic device 202 may identify whether the RSSI is included in a second range representing a strong electric field or a third range representing a medium electric field. For example, in operation 1009, the first electronic device 202 may identify whether the RSSI of the Bluetooth communication signal is greater than or equal to a specified second value (e.g., −45 dB).

According to various embodiments, when the RSSI is greater than or equal to the specified second value (yes in operation 1009), that is, when the RSSI is included in the second range representing a strong electric field, the first electronic device 202 may adjust the driving clock of the processor 320 to a second frequency value (e.g., 104 MHz) in operation 1011.

According to various embodiments, when the RSSI is less than the specified second value (no in operation 1009), that is, when the RSSI is included in the third range representing a medium electric field, the first electronic device 202 may adjust the frequency value of the driving clock of the processor 320 based on a specified condition in operation 1013. According to an embodiment, the first electronic device 202 may adjust the driving clock of the processor 320 to a frequency value (e.g., 122 MHz) between the first frequency value and the second frequency value. According to another embodiment, the first electronic device 202 may adjust the driving clock of the processor 320 to the first frequency value or the second frequency value based on the specified condition (e.g., the specified condition may be the same as the condition described before with reference to FIG. 6).

According to various embodiments, when a plurality of functions are not currently executed (no in operation 1004), operation 1015, 1017, 1019, 1021, and 1023 may be performed in the same manner as operation 615 to operation 623 of FIG. 6. That is, the first electronic device 202 may adjust the driving clock of the processor 320 based on the RSSI, without considering the performance of the other functions, because no functions other than the first function are being executed.

According to various embodiments, the first electronic device 202 may set a frequency value of the driving clock in the case of simultaneous execution of two functions to be different from a frequency value of the driving clock in the case of simultaneous execution of three functions. For example, the first electronic device 202 may set the frequency value of the driving clock in the case of simultaneous execution of three functions to be higher than the frequency value of the driving clock in the case of simultaneous execution of two functions.

Figure 11:
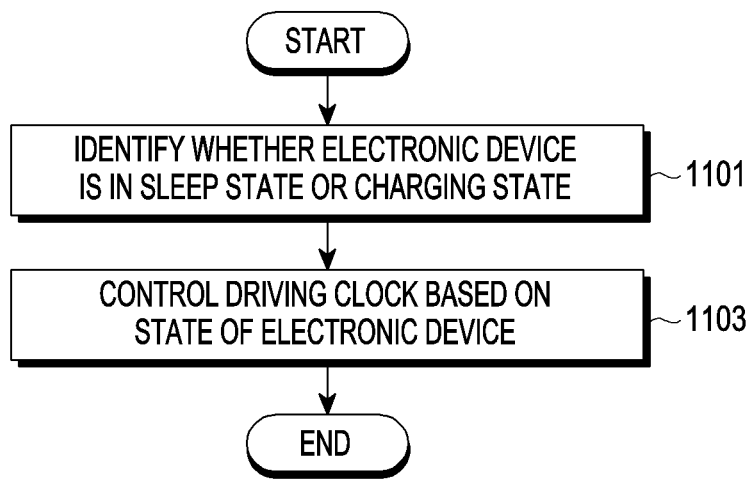
FIG. 11 is a flowchart illustrating a method of controlling a driving clock based on whether a first electronic device is in a sleep state or a charging state in the first electronic device according to an embodiment of the disclosure.

FIG. 11 is a flowchart illustrating a method of controlling a driving clock based on whether a first electronic device is in a sleep state or a charging state in the first electronic device according to an embodiment of the disclosure.

Referring to FIG. 11, in operation 1101, the first electronic device 202 may identify whether the first electronic device 202 is in the sleep state or the charging state according to various embodiments. For example, the first electronic device 202 may identify whether the first electronic device 202 is placed on a cradle for charging.

According to various embodiments, in operation 1103, the first electronic device 202 may control a driving clock of the processor 320 based on a state of the first electronic device 202. For example, the first electronic device 202 may decrease the driving clock of the processor 320, when the first electronic device 202 is in the sleep state or the charging state. For example, for a default frequency value of 48 MHz, the first electronic device 202 may set the frequency value of the driving clock to 32 kilohertz (KHz) in the sleep state or the charging state. Alternatively, the first electronic device 202 may set the frequency value of the driving clock to a real time clock (RTC) sleep clock in the sleep state or the charging state. Accordingly, the first electronic device 202 may minimize power consumption.

Figure 12:
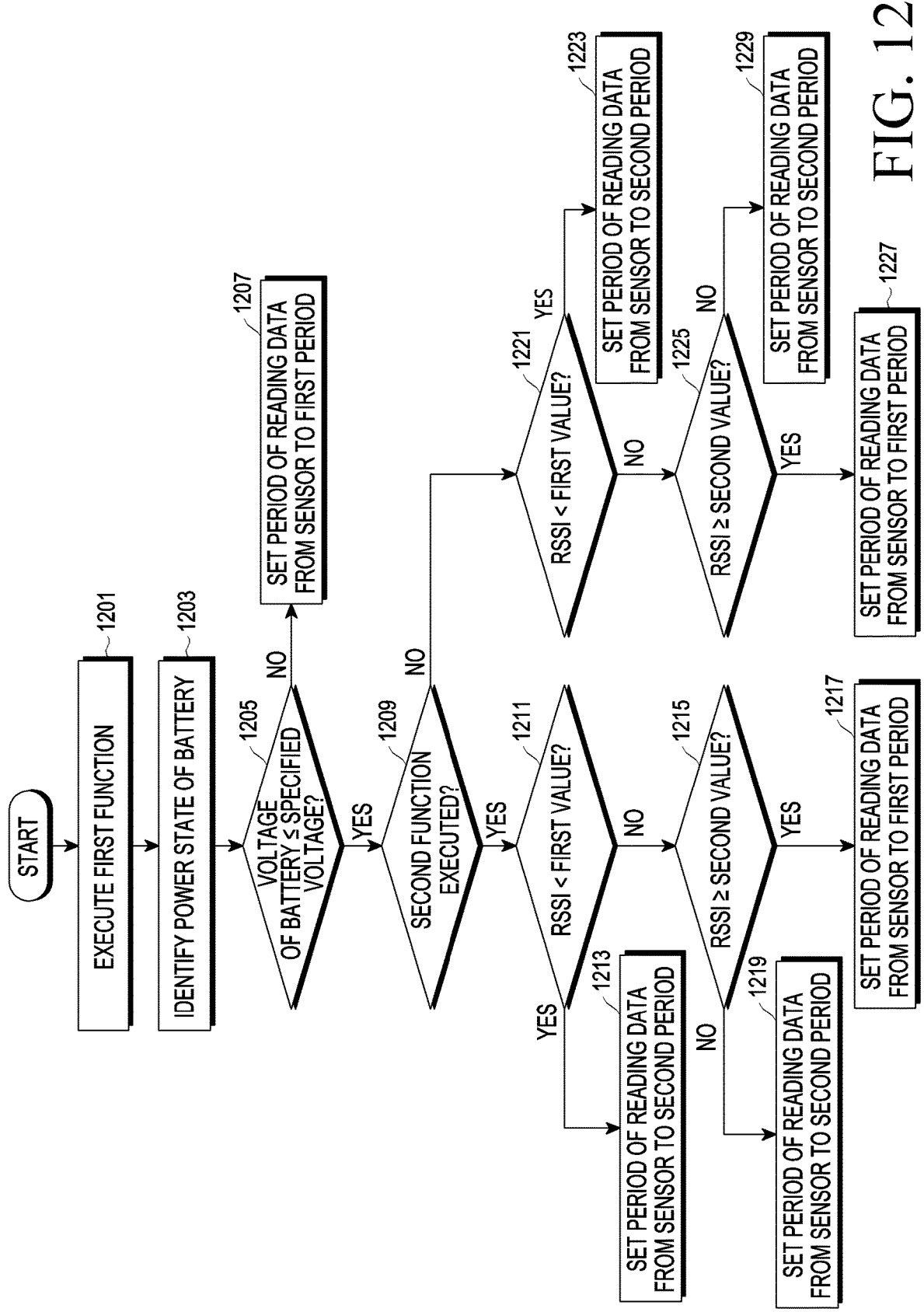
FIG. 12 is a flowchart illustrating a method of changing a period of reading data from a sensor based on a power state of a battery in a first electronic device according to an embodiment of the disclosure.

FIG. 12 is a flowchart illustrating a method of changing a period of reading data from a sensor based on the power state of a battery in a first electronic device according to an embodiment of the disclosure.

Referring to FIG. 12, in operation 1201, the first electronic device 202 may execute a first function of a plurality of functions using the speaker 370 according to various embodiments. For example, the first function may be an A2DP function. For example, the first electronic device 202 may output audio data received from the electronic device 201 via the speaker 370. The first electronic device 202 may read data from the sensor 360 via the sensor hub core 327 at a first period. For example, the first electronic device 202 may read data four times, seven bytes each time according to the first period.

In operation 1203, according to various embodiments, the first electronic device 202 may identify the power state (or charging state) of the battery included in the first electronic device 202. For example, the first electronic device 202 may periodically or aperiodically monitor the power state (or charging state) of the battery.

According to various embodiments, in operation 1205, the first electronic device 202 may identify whether a voltage of the battery is equal to or lower than a specified voltage (e.g., 3.4V). For example, the specified voltage may refer to a threshold for determining whether the battery is in a low power state.

According to various embodiments, when the voltage of the battery is higher than the specified voltage (no in operation 1205), the first electronic device 202 may set (or maintain) the period of reading data from the sensor 360 to the first period in operation 1207.

According to various embodiments, when the battery voltage is equal to or lower than the specified voltage (yes in 1205), the first electronic device 202 may identify whether a second function is executed simultaneously with (or in parallel to) the first function in operation 1209.

According to various embodiments, when the second function is being executed (yes in operation 1209), the first electronic device 202 may identify whether an RSSI is included in a first range representing a weak electric field. For example, in operation 1211, the first electronic device 202 may identify whether the RSSI of a Bluetooth communication signal is less than a specified first value (e.g., −70 dB).

According to various embodiments, when the RSSI is less than the specified first value (yes in operation 1211), that is, when the RSSI is included in the first range representing a weak electric field, the first electronic device 202 may set the period of reading data from the sensor 360 to a second period in operation 1213. For example, the first electronic device 202 may read data from the sensor 360 once at the second period. Therefore, the first electronic device 202 may reduce a time taken to read data (e.g., reduce the delay by 3 ms) and the number of times the data is read (e.g., decrease four times to once), and reduce power consumption.

According to various embodiments, when the RSSI is not less than the specified first value (no in operation 1211), the first electronic device 202 may identify whether the RSSI is included in a second range representing a strong electric field or a third range representing a medium electric field. For example, in operation 1215, the first electronic device 202 may identify whether the RSSI of the Bluetooth communication signal is greater than or equal to a specified second value (e.g., −45 dB).

According to various embodiments, when the RSSI is greater than or equal to the specified second value (yes in operation 1215), that is, when the RSSI is included in the second range representing a strong electric field, the first electronic device 202 may set (or maintain) the period of reading data from the sensor 360 to the first period in operation 1217.

According to various embodiments, when the RSSI is less than the specified second value (no in operation 1215), that is, when the RSSI is in the third range representing a medium electric field, the first electronic device 202 may set the period of reading data from the sensor 360 to the second period in operation 1219.

According to various embodiments, when a plurality of functions are not simultaneously executed (no in operation 1209), the first electronic device 202 may identify whether the RSSI is included in the first range representing a weak electric field. For example, in operation 1221, the first electronic device 202 may identify whether the RSSI of the Bluetooth communication signal is less than the specified first value (e.g., −70 dB).

According to various embodiments, when the RSSI is less than the specified first value (yes in operation 1221), that is, when the RSSI is included in the first range representing a weak electric field, the first electronic device 202 may set the period of reading data from the sensor 360 to the second period in operation 1223.

According to various embodiments, when the RSSI is not less than the specified first value (no in operation 1221), the first electronic device 202 may identify whether the RSSI is included in the second range representing a strong electric field or the third range representing a medium electric field. For example, in operation 1225, the first electronic device 202 may identify whether the RSSI of the Bluetooth communication signal is greater than or equal to the specified second value (e.g., −45 dB).

According to various embodiments, when the RSSI is greater than or equal to the specified second value (e.g., yes in operation 1225), that is, when the RSSI is included in the second range representing a strong electric field, the first electronic device 202 may set (or maintain) the period of reading data from the sensor 360 to the first period in operation 1227.

According to various embodiments, when the RSSI is less than the specified second value (no in operation 1225), that is, when the RSSI is in the third range representing a medium electric field, the first electronic device 202 may set the period of reading data from the sensor 360 to the second period in operation 1229.

According to the above-described method, the first electronic device 202 may reduce power consumption by changing the period of reading data according to each situation.

According to another embodiment, the first electronic device 202 may change the period of reading data from the sensor based on the RSSI of a Bluetooth communication signal regardless of the power state of the battery.

Figure 13:
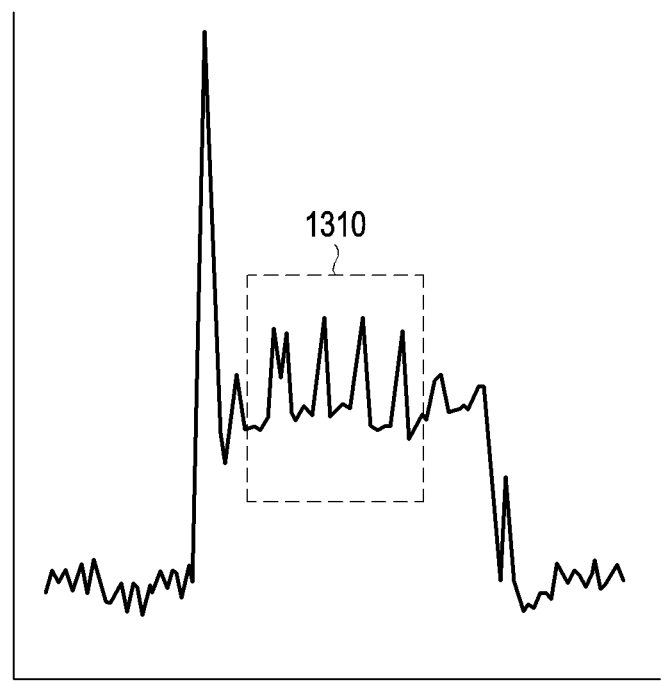
FIG. 13 is a diagram illustrating a method of changing a period of reading data from a sensor based on a power state of a battery in a first electronic device according to an embodiment of the disclosure.
Figure 13:
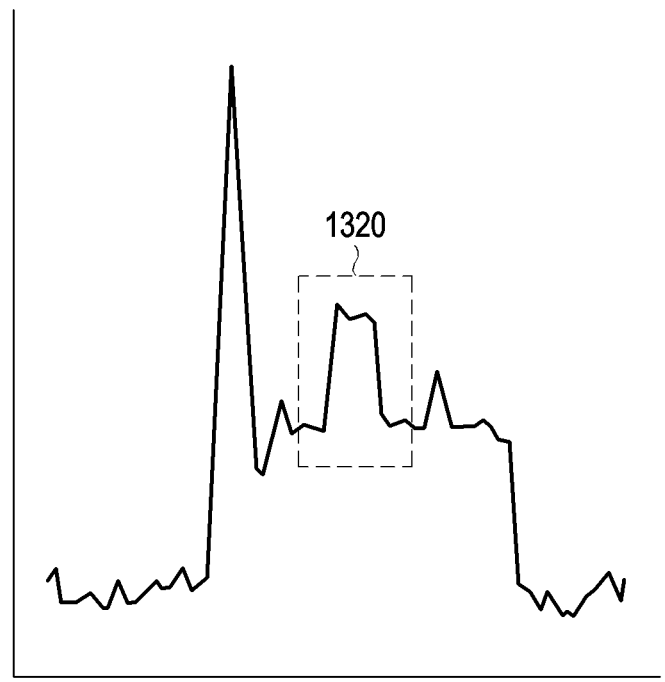

FIG. 13 is a diagram illustrating an operation of changing the period of reading data from a sensor based on the power state of a battery in a first electronic device according to an embodiment of the disclosure.

Referring to part (a) of FIG. 13, the first electronic device 202 may read data from the sensor 360 four times, seven bytes each time at a first period. When the first electronic device 202 reads data from the sensor 360, a current spike may occur. For example, when the first electronic device 202 reads data from the sensor 360 four times, four current spikes may occur in a first data read interval 1310.

Referring to part (b) of FIG. 13, the first electronic device 202 may read data from the sensor 360 once at a second period. When the first electronic device 202 reads data from the sensor 360, a current spike may occur. For example, when the first electronic device 202 reads data from the sensor 360 once, one current spike may occur in a second data read interval 1320. That is, the first electronic device 202 may reduce a time taken to read data (e.g., reduce the delay by 3 ms) and the number of times the data is read (e.g., decrease four times to once) as illustrated in part (b) of FIG. 13. Accordingly, the first electronic device 202 may reduce power consumed to read data from the sensor.

The electronic device 202 according to various embodiments may include the speaker 370, the communication module 340 for supporting Bluetooth communication, one or more processors (e.g., processor 320), and memory storing one or more programs including computer-executable instructions that, when executed by the one or more processors, cause the electronic device to identify an RSSI of a Bluetooth communication signal received from an external electronic device via the communication module, during executing a first function using the speaker, identify whether a second function using the speaker is executed together with the first function, control a frequency value of a driving clock of the one or more processors, based on the RSSI and the first function and the second function being executed together, when the RSSI is included in a first range representing a weak electric field, adjust the driving clock of the one or more processors to a first frequency value, and when the RSSI is included in a second range representing a strong electric field, adjust the driving clock to a second frequency value less than the first frequency value.

The one or more programs further include instructions that, when executed by the one or more processors, cause the electronic device to, when the RSSI is included in a third range representing a medium electric field, adjust the driving clock of the one or more processors to a predetermined third frequency value.

The one or more programs further include instructions that, when executed by the one or more processors, cause the electronic device to, when the RSSI is included in a third range representing a medium electric field, adjust the driving clock of the one or more processors to the first frequency value or the second frequency value.

The one or more programs further include instructions that, when executed by the one or more processors, cause the electronic device to, when the RSSI is changed from the first range to the second range or the third range, adjust the driving clock to the first frequency value, and when the RSSI is changed from the second range to the first range or the third range, adjust the driving clock to the second frequency value.

The one or more programs further include instructions that, when executed by the one or more processors, cause the electronic device to identify that the second function is not executed during the execution of the first function, when the RSSI is included in the first range, adjust the driving clock of the one or more processors to a fourth frequency value less than the second frequency value, and when the RSSI is included in the second range, adjust the driving clock of the one or more processors to a fifth frequency value less than the fourth frequency value.

The one or more programs further include instructions that, when executed by the one or more processors, cause the electronic device to, when the RSSI is included in a third range representing a medium electric field, adjust the driving clock of the one or more processors to the fourth frequency value or the fifth frequency value.

The one or more programs further include instructions that, when executed by the one or more processors, cause the electronic device to, when the RSSI is changed from the first range to the second range or the third range, adjust the driving clock to the fourth frequency value, and when the RSSI is changed from the second range to the first range or the third range, adjust the driving clock to the fifth frequency value.

The one or more programs further include instructions that, when executed by the one or more processors, cause the electronic device to determine the first frequency value and the second frequency value according to a type of the second function.

The one or more programs further include instructions that, when executed by the one or more processors, cause the electronic device to identify the number of currently executed functions among functions supported by the electronic device, and control the frequency value of the driving clock of the one or more processors based on the number of currently executed functions.

The one or more programs further include instructions that, when executed by the one or more processors, cause the electronic device to identify a power state of a battery included in the electronic device, and change a period of reading data from a sensor included in the electronic device based on the power state and the RSSI.

A method performed the electronic device 202 according to various embodiments may include identifying an RSSI of a Bluetooth communication signal received from an external electronic device via the communication module 340 of the electronic device, during executing a first function using a speaker of the electronic device, identifying whether a second function using the speaker is executed together with the first function, and controlling a frequency value of a driving clock of one or more processors included in the electronic device, based on the RSSI and the first function and the second function being executed together. Controlling the frequency value of the driving clock may include, when the RSSI is included in a first range representing a weak electric field, adjusting the driving clock of the one or more processors to a first frequency value, and when the RSSI is included in a second range representing a strong electric field, adjusting the driving clock to a second frequency value less than the first frequency value.

The method may further include, when the RSSI is included in a third range representing a medium electric field, adjusting the driving clock of the one or more processors to a predetermined third frequency value.

The method may further include, when the RSSI is included in a third range representing a medium electric field, adjusting the driving clock of the one or more processors to the first frequency value or the second frequency value.

Adjusting the driving clock may include, when the RSSI is changed from the first range to the second range or the third range, adjusting the driving clock to the first frequency value, and when the RSSI is changed from the second range to the first range or the third range, adjusting the driving clock to the second frequency value.

The method may further include identifying that the second function is not executed during the execution of the first function, when the RSSI is included in the first range, adjusting the driving clock of the one or more processors to a fourth frequency value less than the second frequency value, and when the RSSI is included in the second range, adjusting the driving clock of the one or more processors to a fifth frequency value less than the fourth frequency value.

The method may further include, when the RSSI is included in a third range representing a medium electric field, adjusting the driving clock of the one or more processors to the fourth frequency value or the fifth frequency value.

Adjusting the driving clock may include, when the RSSI is changed from the first range to the second range or the third range, adjusting the driving clock to the fourth frequency value, and when the RSSI is changed from the second range to the first range or the third range, adjusting the driving clock to the fifth frequency value.

The method may further include determining the first frequency value and the second frequency value according to a type of the second function.

The method may further include identifying a power state of a battery included in the electronic device, and changing a period of reading data from a sensor included in the electronic device based on the power state and the RSSI.

One or more non-transitory storage media including computer-executable instructions that, when executed by one or more processors of an electronic device, cause the electronic device to perform operations, the operations including identifying an RSSI of a Bluetooth communication signal received from an external electronic device via the communication module 340 of the electronic device 202, identifying whether a second function the speaker 370 or the electronic device is executed together with a first function using the speaker, during execution of the first function, and controlling a frequency value of a driving clock of one or more processors included in the electronic device, based on the RSSI and the first function and the second function being executed together. Controlling the frequency value of the driving clock may include, when the RSSI is included in a first range representing a weak electric field, adjusting the driving clock of the one or more processors to a first frequency value, and when the RSSI is included in a second range representing a strong electric field, adjusting the driving clock to a second frequency value less than the first frequency value.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a speaker;
communication circuitry for supporting Bluetooth communication;
memory, comprising one or more storage media, storing instructions; and
one or more processors communicatively coupled to the speaker, the communication circuitry, and the memory,
wherein the instructions, when executed by the one or more processors individually or collectively, cause the electronic device to:
identify a received signal strength indication (RSSI) of a Bluetooth communication signal received from an external electronic device via the communication circuitry,
during executing a first function utilizing the speaker, identify whether a second function utilizing the speaker is executed together with the first function,
control a frequency value of a driving clock of the one or more processors based on the RSSI, the first function, and the second function, wherein the first function and the second function are being executed together,
when the RSSI is included in a first range representing a weak electric field, adjust the driving clock of the one or more processors to a first frequency value, and
when the RSSI is included in a second range representing a strong electric field, adjust the driving clock to a second frequency value less than the first frequency value.

2. The electronic device of claim 1, wherein the instructions, when executed by the one or more processors individually or collectively, further cause the electronic device to:
when the RSSI is included in a third range representing a medium electric field, adjust the driving clock of the one or more processors to a predetermined third frequency value.

3. The electronic device of claim 1, wherein the instructions, when executed by the one or more processors individually or collectively, further cause the electronic device to:
when the RSSI is included in a third range representing a medium electric field, adjust the driving clock of the one or more processors to the first frequency value or the second frequency value.

4. The electronic device of claim 3, wherein the instructions, when executed by the one or more processors individually or collectively, further cause the electronic device to:
when the RSSI is changed from the first range to the second range or the third range, adjust the driving clock to the first frequency value, and
when the RSSI is changed from the second range to the first range or the third range, adjust the driving clock to the second frequency value.

5. The electronic device of claim 1, wherein the instructions, when executed by the one or more processors individually or collectively, further cause the electronic device to:
identify that the second function is not executed during the executing of the first function,
when the RSSI is included in the first range, adjust the driving clock of the one or more processors to a fourth frequency value less than the second frequency value, and
when the RSSI is included in the second range, adjust the driving clock of the one or more processors to a fifth frequency value less than the fourth frequency value.

6. The electronic device of claim 5, wherein the instructions, when executed by the one or more processors individually or collectively, further cause the electronic device to:
when the RSSI is included in a third range representing a medium electric field, adjust the driving clock of the one or more processors to the fourth frequency value or the fifth frequency value.

7. The electronic device of claim 6, wherein the instructions, when executed by the one or more processors individually or collectively, further cause the electronic device to:
when the RSSI is changed from the first range to the second range or the third range, adjust the driving clock to the fourth frequency value, and
when the RSSI is changed from the second range to the first range or the third range, adjust the driving clock to the fifth frequency value.

8. The electronic device of claim 1, wherein the instructions, when executed by the one or more processors individually or collectively, further cause the electronic device to:
determine the first frequency value and the second frequency value according to a type of the second function.

9. The electronic device of claim 1, wherein the instructions, when executed by the one or more processors individually or collectively, further cause the electronic device to:
identify a number of currently executed functions among functions supported by the electronic device, and
control the frequency value of the driving clock of the one or more processors based on the number of currently executed functions.

10. The electronic device of claim 1, wherein the instructions, when executed by the one or more processors individually or collectively, further cause the electronic device to:
identify a power state of a battery included in the electronic device, and
change a period of reading data from a sensor included in the electronic device based on the power state and the RSSI.

11. A method performed by an electronic device, the method comprising:
identifying a received signal strength indication (RSSI) of a Bluetooth communication signal received from an external electronic device via communication circuitry of the electronic device;
during executing a first function utilizing a speaker of the electronic device, identifying whether a second function utilizing the speaker is executed together with the first function; and
controlling a frequency value of a driving clock of one or more processors included in the electronic device based on the RSSI, the first function, and the second function,
wherein the first function and the second function are being executed together, and
wherein the controlling of the frequency value of the driving clock comprises:
based on the RSSI is being included in a first range representing a weak electric field, adjusting the driving clock of the one or more processors to a first frequency value, and
based on the RSSI being included in a second range representing a strong electric field, adjusting the driving clock to a second frequency value less than the first frequency value.

12. The method of claim 11, further comprising:
based on the RSSI being included in a third range representing a medium electric field, adjusting the driving clock of the one or more processors to a predetermined third frequency value.

13. The method of claim 11, further comprising:
based on the RSSI being included in a third range representing a medium electric field, adjusting the driving clock of the one or more processors to the first frequency value or the second frequency value.

14. The method of claim 13, wherein the adjusting of the driving clock of the one or more processors to the first frequency value or the second frequency value comprises:
based on the RSSI changing from the first range to the second range or the third range, adjusting the driving clock to the first frequency value; and
based on the RSSI changing from the second range to the first range or the third range, adjusting the driving clock to the second frequency value.

15. The method of claim 11, further comprising:
identifying that the second function is not executed during the executing of the first function;
based on the RSSI being included in the first range, adjusting the driving clock of the one or more processors to a fourth frequency value less than the second frequency value; and
based on the RSSI being included in the second range, adjusting the driving clock of the one or more processors to a fifth frequency value less than the fourth frequency value.

16. The method of claim 15, further comprising:
based on the RSSI being included in a third range representing a medium electric field, adjusting the driving clock of the one or more processors to the fourth frequency value or the fifth frequency value.

17. The method of claim 16, further comprising:
based on the RSSI changing from the first range to the second range or the third range, adjusting the driving clock to the fourth frequency value, and based on the RSSI changing from the second range to the first range or the third range, adjusting the driving clock to the fifth frequency value.

18. The method of claim 11, further comprising:
determining the first frequency value and the second frequency value according to a type of the second function.

19. One or more non-transitory computer-readable storage media storing one or more programs including computer-executable instructions that, when executed by one or more processors of an electronic device, cause the electronic device to perform operations, the operations comprising:
  identifying a received signal strength indication (RSSI) of a Bluetooth communication signal received from an external electronic device via communication circuitry of the electronic device;
  during executing a first function utilizing a speaker of the electronic device, identifying whether a second function utilizing the speaker is executed together with the first function; and
  controlling a frequency value of a driving clock of the one or more processors included in the electronic device based on the RSSI, the first function, and the second function,
  wherein the first function and the second function are being executed together, and
  wherein the controlling of the frequency value of the driving clock comprises:
    based on the RSSI being included in a first range representing a weak electric field, adjusting the driving clock of the one or more processors to a first frequency value, and
    based on the RSSI being included in a second range representing a strong electric field, adjusting the driving clock to a second frequency value less than the first frequency value.

20. The one or more non-transitory computer-readable storage media of claim 19, the operations further comprising:
  based on the RSSI being included in a third range representing a medium electric field, adjusting the driving clock of the one or more processors to a predetermined third frequency value.

* * * * *